United States Patent
Yan et al.

(10) Patent No.: US 9,319,612 B2
(45) Date of Patent: Apr. 19, 2016

(54) IMAGERS WITH IMPROVED ANALOG-TO-DIGITAL CIRCUITRY

(71) Applicant: Semiconductor Components Industries, LLC, Phoenix, AZ (US)

(72) Inventors: Hai Yan, San Ramon, CA (US); Kwang-bo Cho, San Jose, CA (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 48 days.

(21) Appl. No.: 13/967,272

(22) Filed: Aug. 14, 2013

(65) Prior Publication Data

US 2015/0009379 A1 Jan. 8, 2015

Related U.S. Application Data

(60) Provisional application No. 61/843,820, filed on Jul. 8, 2013.

(51) Int. Cl.
*H04N 5/378* (2011.01)
*H04N 5/3745* (2011.01)
*H04N 5/355* (2011.01)

(52) U.S. Cl.
CPC ............. *H04N 5/378* (2013.01); *H04N 5/3559* (2013.01); *H04N 5/37452* (2013.01); *H04N 5/37455* (2013.01)

(58) Field of Classification Search
CPC . H04N 5/3696; H04N 5/37457; H04N 5/357; H04N 5/378; H04N 5/3575; H01L 27/14806
USPC .................................................. 348/294–324
See application file for complete search history.

(56) References Cited

U.S. PATENT DOCUMENTS

| | | | | |
|---|---|---|---|---|
| 7,339,672 B2* | 3/2008 | Hashiguchi et al. | .......... | 356/394 |
| 8,115,842 B2* | 2/2012 | Lebouleux et al. | ........... | 348/294 |
| 8,698,706 B1* | 4/2014 | Rutherford | ..................... | 345/45 |
| 8,736,684 B1* | 5/2014 | Johansson et al. | ............ | 348/187 |
| 2004/0169128 A1* | 9/2004 | Mizuno | ..................... | 250/214 R |
| 2005/0051707 A1* | 3/2005 | Bamji et al. | ............... | 250/214 R |
| 2005/0151060 A1* | 7/2005 | Hashiguchi et al. | ....... | 250/208.1 |
| 2006/0192870 A1* | 8/2006 | Shoho et al. | .................. | 348/294 |
| 2007/0120990 A1* | 5/2007 | Sato et al. | ..................... | 348/294 |
| 2007/0257284 A1* | 11/2007 | Xu | ................. | 257/291 |
| 2008/0001802 A1* | 1/2008 | Higuchi | ........................ | 341/155 |
| 2009/0079857 A1* | 3/2009 | Kato et al. | .................... | 348/294 |
| 2009/0212827 A1* | 8/2009 | Keel et al. | ........................ | 327/73 |
| 2011/0316839 A1* | 12/2011 | Minowa et al. | ................ | 345/211 |
| 2012/0038809 A1* | 2/2012 | Lee et al. | ..................... | 348/308 |
| 2012/0133800 A1* | 5/2012 | Jung et al. | ..................... | 348/241 |
| 2012/0241594 A1* | 9/2012 | Noiret et al. | ................ | 250/208.1 |
| 2012/0262622 A1 | 10/2012 | Kim et al. | | |

(Continued)

*Primary Examiner* — Pritham Prabhakher
(74) *Attorney, Agent, or Firm* — Treyz Law Group, P.C.; Andrew C. Milhollin

(57) ABSTRACT

An imager may include an array of pixels. The pixel array may be arranged in rows and columns. Each pixel of the pixel array may include a photodiode that is coupled to a floating diffusion region by a transfer gate. A source-follower transistor may be coupled between the floating diffusion region and a pixel output node. The imager may include ramp circuitry that provides a ramp signal to the floating diffusion region. A capacitor interposed between the ramp circuitry and the floating diffusion region may be used in conveying the ramp signal to the floating diffusion region. The pixel may be coupled to a comparator that is implemented using separate circuitry or may include portions of the pixel.

16 Claims, 16 Drawing Sheets

(56) References Cited

U.S. PATENT DOCUMENTS

| | | |
|---|---|---|
| 2012/0307120 A1* | 12/2012 | Ito et al. .................. 348/302 |
| 2013/0070135 A1 | 3/2013 | Bahukhandi et al. |
| 2013/0087688 A1 | 4/2013 | Saito et al. |
| 2013/0188085 A1 | 7/2013 | Shim et al. |
| 2013/0271633 A1* | 10/2013 | Hashimoto et al. ........... 348/300 |
| 2014/0124648 A1* | 5/2014 | Yin et al. .................. 250/208.1 |
| 2014/0313385 A1* | 10/2014 | Sato et al. .................. 348/302 |

\* cited by examiner

IMAGERS WITH IMPROVED ANALOG-TO-DIGITAL CIRCUITRY

This application claims the benefit of provisional patent application No. 61/843,820, filed Jul. 8, 2013 which is hereby incorporated by reference herein in its entirety.

BACKGROUND

This relates generally to imaging systems, and more particularly to imaging systems with analog-to-digital converter circuitry.

Modern electronic devices such as cellular telephones, cameras, and computers often use digital image sensors. Imagers (i.e., image sensors) may be formed from a two-dimensional array of image sensing pixels. Each pixel receives incident photons (light) and converts the photons into electrical signals. Image sensors are sometimes designed to provide images to electronic devices using a Joint Photographic Experts Group (JPEG) format.

Analog pixel output signals from the image sensing pixels can be sampled using separate sample-and-hold circuitry that is coupled to the pixels. The sample-and-hold circuitry includes capacitors on which the pixel reset level and the pixel signal level are sampled and are then provided to a comparator. A ramp voltage is applied to the pixel signal level until the pixel signal level reaches the pixel reset level and the comparator output inverts. During the application of the ramp voltage, a counter is used to count how much time passes between application of the ramp voltage and the inversion of the comparator output.

Conventional ramp circuitry applies the ramp voltage to a capacitor at the input of the comparator of the sample-and-hold circuitry. However, such an arrangement requires a high pixel supply voltage in order to support a wide range of pixel output signals sampled onto the capacitor (e.g., sufficient to support the well capacity of the pixel). The capacitor is required to have a capacitance sufficient to satisfy noise requirements such as a maximum amount of thermal ($k*T/C$) noise, which in turn requires the ramp circuitry to have high driving capability for driving the large capacitor. Conventional capacitors used in ramp circuitry can be hundreds of femtofarads (fF). The large sample-and-hold capacitor also occupies valuable circuit area of the imager. In addition, the pixel array is typically read by scanning pixel rows in sequential order. This sequential scanning can lead to row-dependent noise in the image output signals of the pixel array. For example, transient noise in a power supply signal is consistent throughout the pixels of a row but varies between rows. It would therefore be desirable to provide imagers with improved pixel readout and analog-to-digital conversion capabilities.

DETAILED DESCRIPTION

Figure 1:
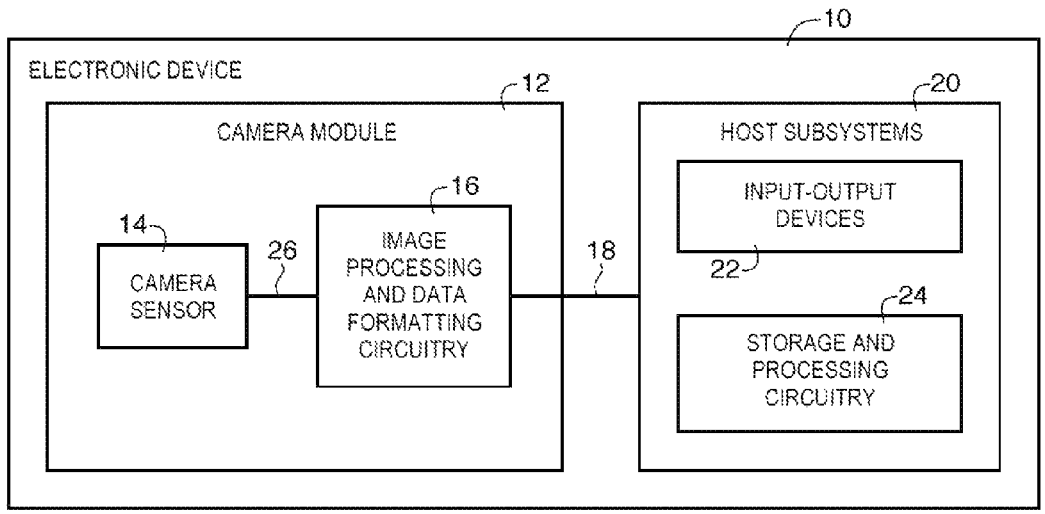
FIG. 1 is an illustrative schematic diagram of an electronic device with a camera sensor that may include pixels with improved pixel readout capabilities in accordance with an embodiment of the present invention.

Embodiments of the present invention relate to image sensors with improved readout capabilities. An electronic device with a digital camera module is shown in FIG. 1. Electronic device 10 may be a digital camera, a computer, a cellular telephone, a medical device, or other electronic device. Camera module 12 may include image sensor 14 and one or more lenses. During operation, the lenses focus light onto image sensor 14. Image sensor 14 includes photosensitive elements (e.g., pixels) that convert the light into digital data. Image sensors may have any number of pixels (e.g., hundreds, thousands, millions, or more). A typical image sensor may, for example, have millions of pixels (e.g., megapixels). As examples, image sensor 14 may include bias circuitry (e.g., source follower load circuits), sample and hold circuitry, correlated double sampling (CDS) circuitry, amplifier circuitry, analog-to-digital (ADC) converter circuitry, data output circuitry, memory (e.g., buffer circuitry), address circuitry, etc.

Still and video image data from camera sensor 14 may be provided to image processing and data formatting circuitry 16 via path 26. Image processing and data formatting circuitry 16 may be used to perform image processing functions such as three-dimensional depth sensing, data formatting, adjusting white balance and exposure, implementing video image stabilization, face detection, etc. Image processing and data formatting circuitry 16 may also be used to compress raw camera image files if desired (e.g., to Joint Photographic Experts Group or JPEG format). In a typical arrangement, which is sometimes referred to as a system on chip (SOC) arrangement, camera sensor 14 and image processing and data formatting circuitry 16 are implemented on a common integrated circuit. The use of a single integrated circuit to implement camera sensor 14 and image processing and data formatting circuitry 16 can help to reduce costs.

Camera module 12 may convey acquired image data to host subsystems 20 over path 18 (e.g., image processing and data formatting circuitry 16 may convey image data to subsystems 20). Electronic device 10 typically provides a user with numerous high-level functions. In a computer or advanced cellular telephone, for example, a user may be provided with the ability to run user applications. To implement these functions, host subsystem 20 of electronic device 10 may include storage and processing circuitry 24 and input-output devices 22 such as keypads, input-output ports, joysticks, and displays. Storage and processing circuitry 24 may include volatile and nonvolatile memory (e.g., random-access memory, flash memory, hard drives, solid state drives, etc.). Storage and processing circuitry 24 may also include microprocessors, microcontrollers, digital signal processors, application specific integrated circuits, or other processing circuits.

Figure 2:
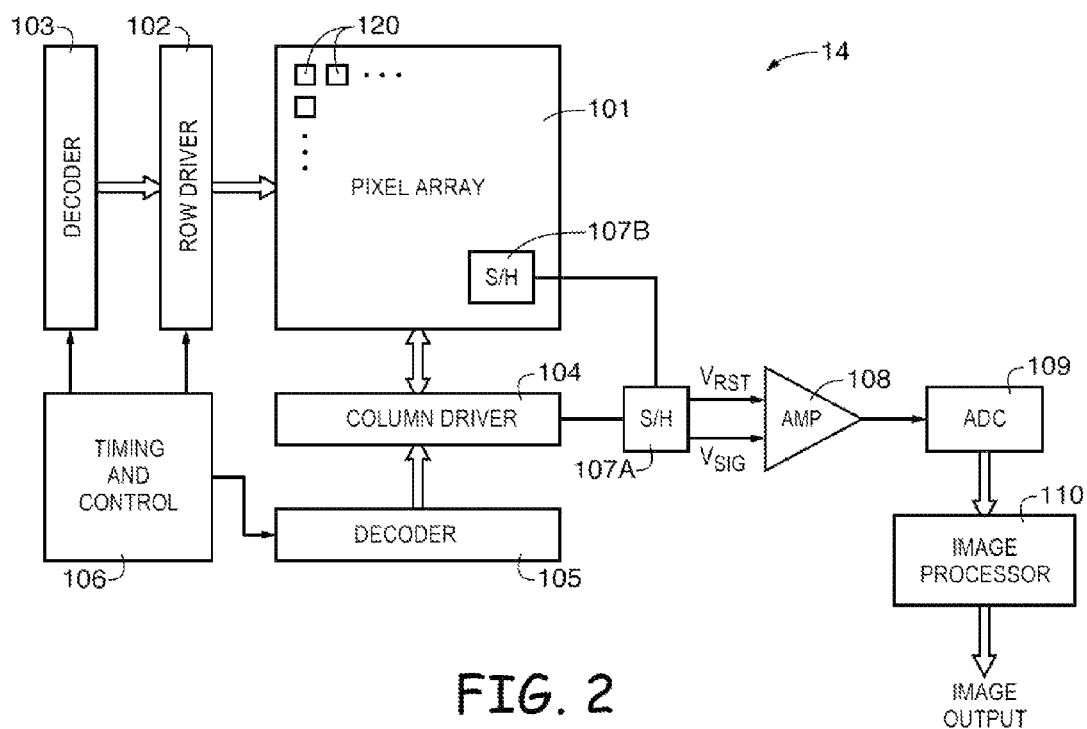
FIG. 2 is a block diagram of an imager employing pixels with improved pixel readout capabilities in accordance with an embodiment of the present invention.

FIG. 2 illustrates a simplified block diagram of an imager 14, for example a CMOS imager, employing a pixel array 101 with pixels having improved analog-to-digital conversion capabilities. Pixel array 101 includes an array of pixels 120 arranged in a predetermined number of columns and rows. The row lines are selectively activated by the row driver 102 in response to row address decoder 103 and the column select lines are selectively activated by the column driver 104 in response to column address decoder 105. Thus, a row and column address is provided for each pixel.

Imager 14 is operated by a timing and control circuit 106, which controls decoders 103 and 105 for selecting the appropriate row and column lines for pixel readout, and row and column driver circuitry 102, 104, which apply driving voltages to the drive transistors of the selected row and column lines. The pixel signals, which typically include a pixel reset signal Vrst and a pixel image signal Vsig for each pixel (or each photosensitive region of each pixel) are sampled by sample and hold circuitry 107A associated with the column driver 104 and sample and hold circuitry 107B within pixel array 101 (e.g., sample and hold circuitry 107B may include portions of each pixel). A differential signal Vrst-Vsig is produced for each pixel (or each photosensitive area of each pixel), which is amplified by an amplifier 108 and digitized by analog-to-digital converter 109. The analog to digital converter 109 converts the analog pixel signals to digital signals, which are fed to an image processor 310 which forms a digital image. Image processor 310 may, for example, be provided as part of image processing and data formatting circuitry 16 of FIG. 1.

Figure 3:
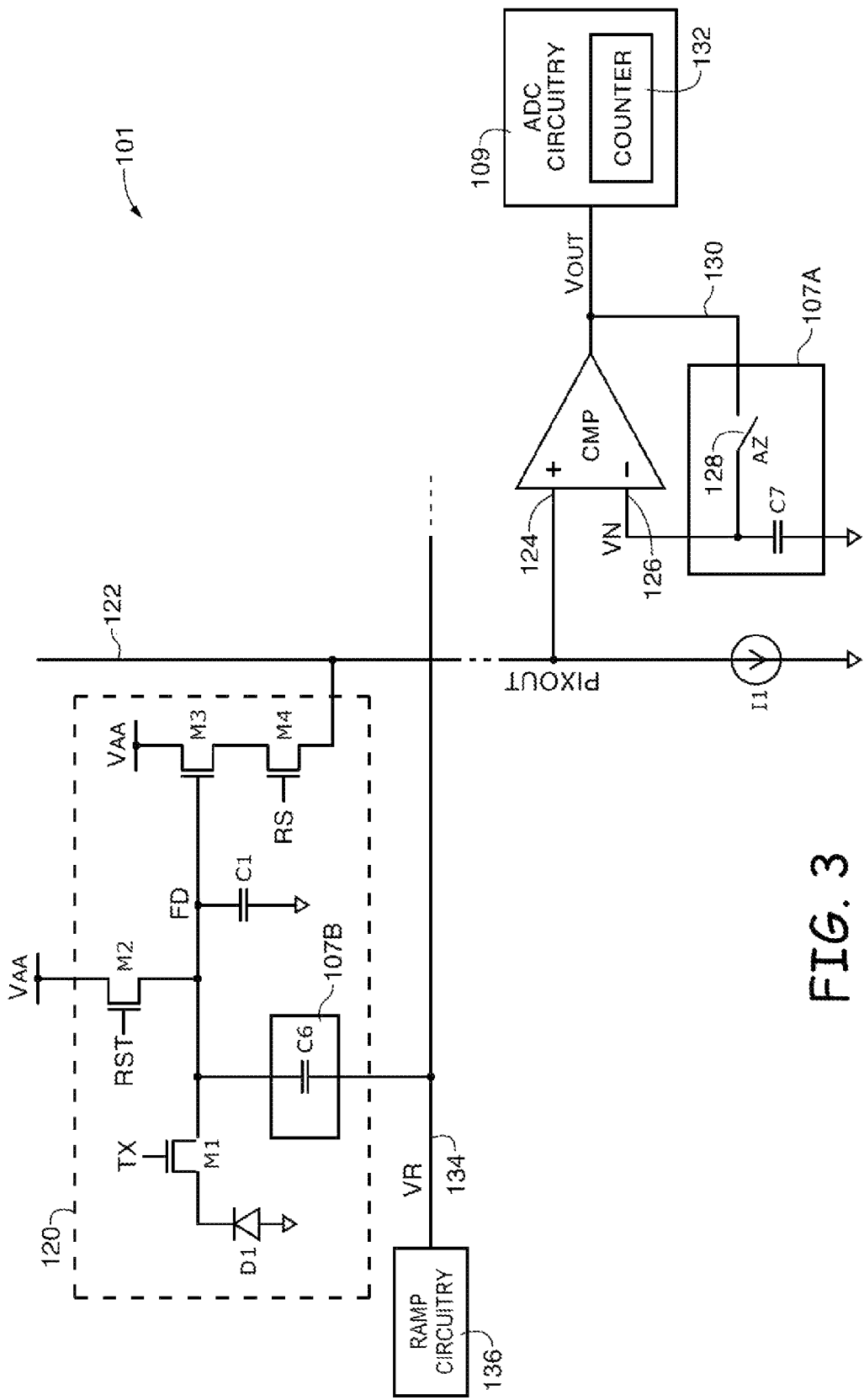
FIG. 3 is a circuit diagram of a portion of an imager including a pixel that receives a ramp signal at a floating diffusion region in accordance with an embodiment of the present invention.

FIG. 3 is a diagram of an illustrative portion of pixel array 101 including a pixel 120 and associated readout circuitry. As shown in FIG. 3, pixel 120 may include a photodiode D1 that is coupled to floating diffusion region FD by transfer gate M1 (e.g., a transistor pass gate) that is controlled by signal TX. Floating diffusion region FD may be coupled to pixel supply voltage VAA by reset transistor M2 that is controlled by reset signal RST. Pixel charge may be stored on capacitor C1 coupled between floating diffusion region C1 and ground. Capacitor C1 may be a discrete capacitor component or may be formed from parasitic capacitances such as associated with the gate of transistor M3. Pixel 120 may include a capacitor C6 through which a ramp signal is applied to floating diffusion region FD.

Floating diffusion region FD may be coupled to pixel column path 122 via transistor M3 that forms a source-follower amplifier and row select transistor M4 controlled by row select control signal RS. Pixel column path 122 may serve as a pixel output node shared by the pixels of a column of the array. Column driver circuitry such as column driver 104 of FIG. 2 may supply bias current I1 to column path 122.

During pixel readout operations, the output signal PIXOUT of pixel 120 may be provided to comparator CMP (e.g., PIXOUT may be equivalent to Vsig provided to amplifier 108 of FIG. 2). Comparator CMP may have a first (e.g., positive) input 124 and a second (e.g., negative input) 126. A negative feedback path 130 may be coupled from the output of comparator CMP to negative input 126. Negative feedback path 130 may include switch 128 (e.g., a transistor) that is controlled by signal AZ. Sample and hold circuitry 107A in the negative feedback path such as capacitor C7 and switch 128 may be used to store signal VN that is supplied to comparator input 126. Signal VN may, for example, be equivalent to sample and hold reset signal Vrst of FIG. 2. Capacitor C7 may be coupled between comparator input 126 and a ground terminal. Output VOUT of comparator CMP may be provided to analog-to-digital (ADC) circuitry 109. ADC circuitry 109 may include a counter 132 that can be used along with comparator CMP during analog-to-digital conversion operations.

As shown in FIG. 3, it is not necessary to provide a capacitor to sample signals at the input of comparator CMP. Sample and hold circuitry 107B within pixel 120 may be used in combination with sample and hold circuitry 107A to perform sample and hold operations. Sample and hold circuitry 107B may receive ramp signal VR from ramp circuitry 136 via path 134 in performing sample and hold operations. Ramp circuitry 136 may be formed as part of pixel array 101 or may be included in row driver circuitry such as row driver circuitry 102 of FIG. 2. Ramp signal path 134 may extend across the row of pixel 120 (e.g., signal path 134 may be coupled to and provide ramp signal VR to each pixel of the row).

Figure 4:
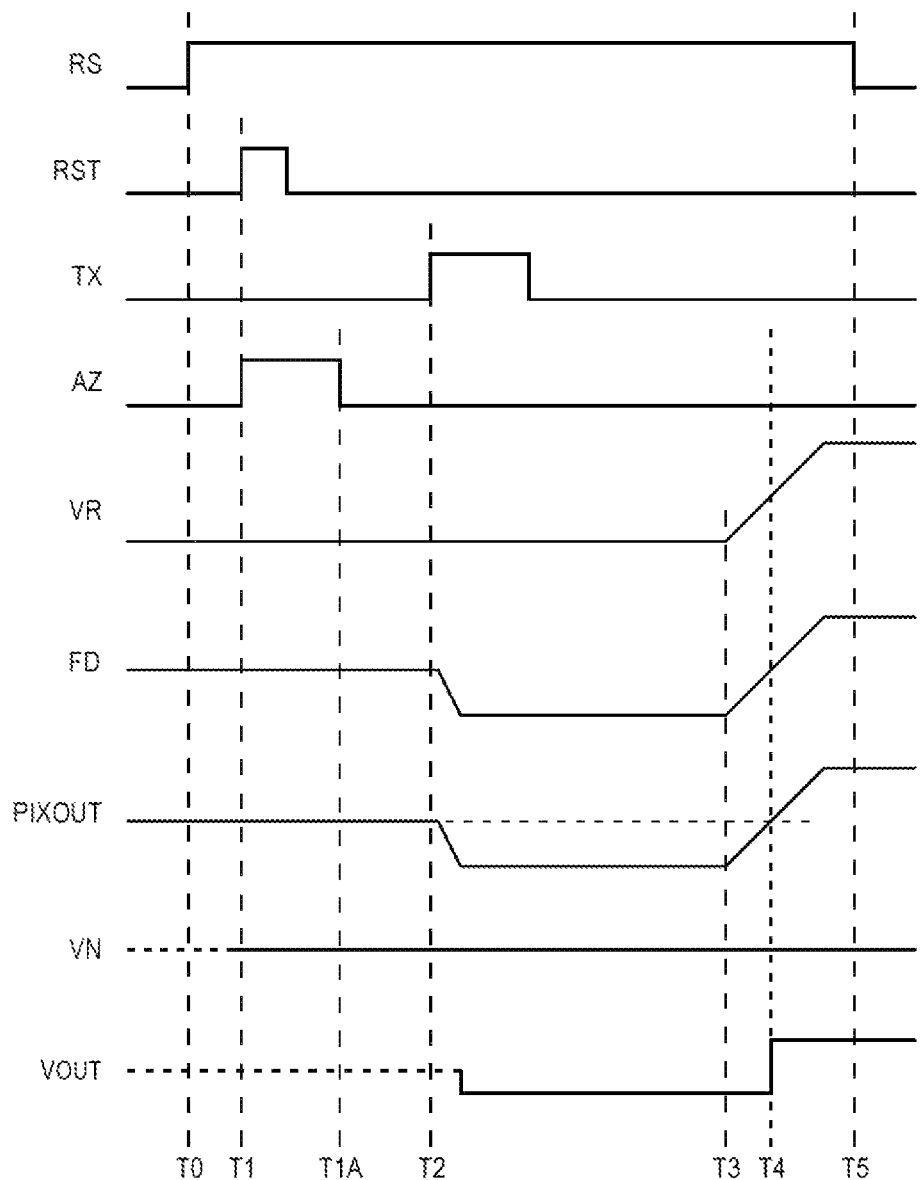
FIG. 4 is a timing diagram of pixel readout operations that may be performed using the pixel of FIG. 3 in accordance with an embodiment of the present invention.

FIG. 4 is a timing diagram of illustrative read-out operations that may be performed using pixel 120 and associated read-out circuitry such as comparator CMP and ADC circuitry 109 of FIG. 3. Readout operations may be performed between times T0 and T5 during which row select signal RS is asserted for pixel 120. At initial time T0, row select signal RS may be asserted for pixel 120 and other pixels of the same row. At time T1, reset signal RST for resetting the pixel may be pulsed, which temporarily enables transistor M2 and helps to ensure that floating diffusion region FD is initialized to supply voltage VAA. Voltage VN on capacitor C7 may also be reset by pulsing signal AZ, which temporarily enables switch 128 and stores a voltage corresponding to the pixel reset level at time T1A (e.g., Vrst of FIG. 2). In other words, an auto-zero operation may be performed to calibrate signal VN provided to comparator CMP by performing a sample and hold reset operation. Signal AZ may be provided by row control circuitry such as row driver 102 of FIG. 2.

At time T2, control signal TX may be pulsed, which temporarily enables transfer gate M1, which transfers integrated charge from photodiode D1 to floating diffusion region FD. As a result, the voltage levels at floating diffusion region FD and pixel output voltage PIXOUT drop by an amount corresponding to the amount of charge transferred (e.g., reflecting the amount of charge accumulated by photodiode D1 during an exposure period).

At time T3, ramp circuitry 136 may apply a ramp signal VR to path 134 that increases in voltage at a predetermined rate (e.g., starting from zero volts or a pixel ground voltage). The ramp signal is passed to floating diffusion region FD by capacitor C6. In other words, the voltage levels at floating diffusion region FD and pixel output signal PIXOUT increase at the predetermined rate. At time T3, ADC circuitry 109 may activate (enable) counter 132 that counts while the ramp signal is supplied. At time T4, the voltage of pixel output signal PIXOUT matches the voltage of signal VN (i.e., the pixel output reset value sampled at time T1A). At time T4, output VOUT of comparator CMP inverts and is used to latch the count of counter 132. The latched count of counter 132 reflects the amount of integrated charge transferred from photodiode D1 to floating diffusion region D1 and may be used as the output of ADC circuitry 109 (e.g., provided to image processor 110 of FIG. 2).

In arrangements in which ramp signal VR is supplied to floating diffusion FD, pixel supply voltage VAA can be reduced, because it is not necessary for pixel output signal PIXOUT to support a full range of voltages. Capacitor C6 used to help store accumulated photodiode charge and convey ramp signal VR can be relatively small (e.g., one femtofarad, several femtofarads such as two or three femtofarads, etc.), which helps to reduce the capacitive load to the ramp circuitry 136. Readout circuitry area is also reduced because it is not necessary to include sample and hold circuitry at input 124 of comparator CMP (e.g., because ramp signal VR is applied to floating diffusion region FD). Row-dependent noise may be reduced, because no sample and hold operations are performed across entire rows of pixels at inputs 124 of comparators.

Figure 5:
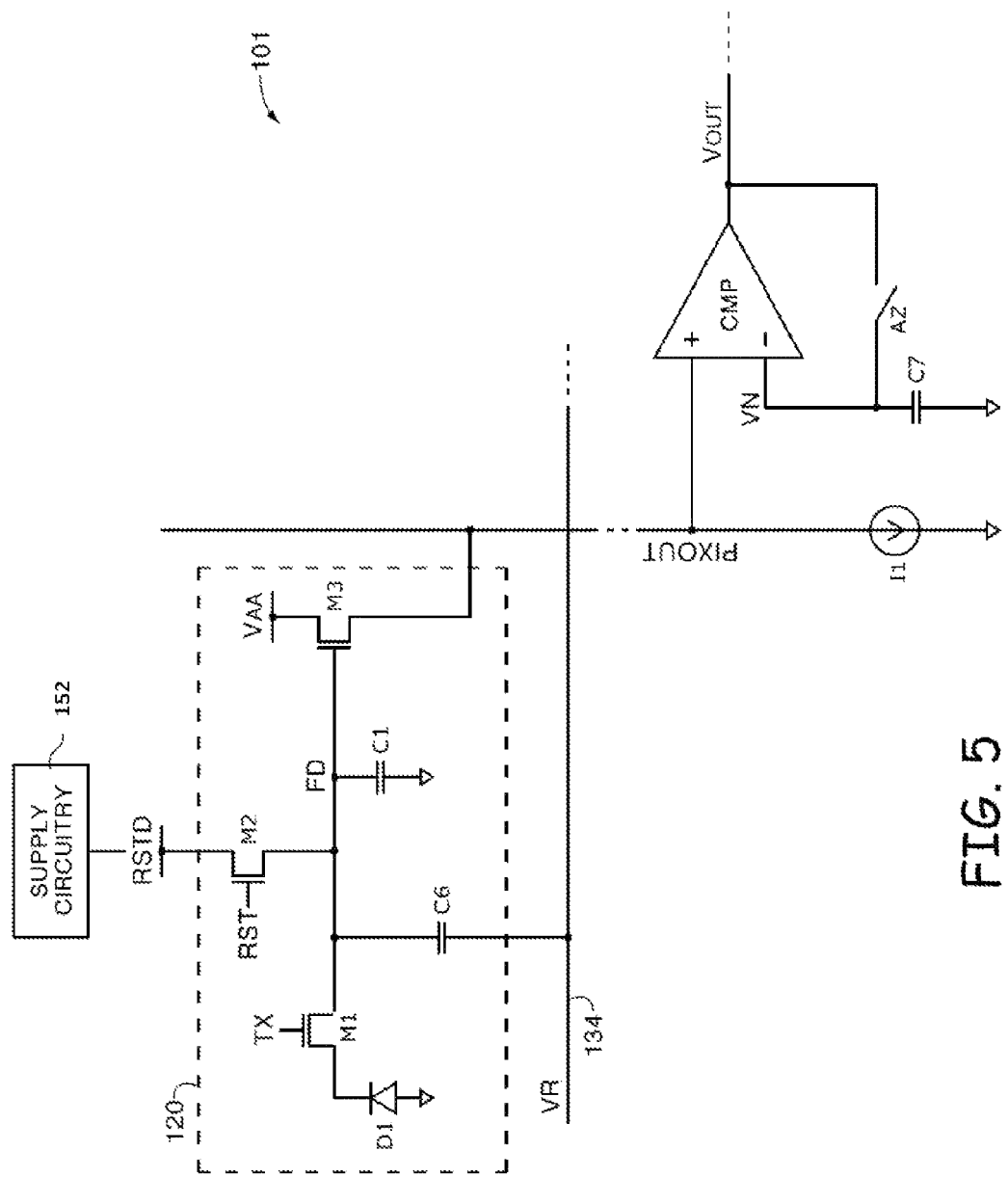
FIG. 5 is a circuit diagram of a portion of an imager including a pixel that receives a ramp signal at a floating diffusion region and is selectively enabled using a reset transistor in accordance with an embodiment of the present invention.

If desired, row select transistor M4 may be omitted as shown in FIG. 5. In the example of FIG. 5, supply circuitry 152 may provide a control signal RSTD to a source-drain terminal of transistor M2. Supply circuitry 152 may be formed as part of pixel array 101 or may be implemented separately (e.g., as part of row driver circuitry 102 of FIG. 2).

Control signal RSTD and reset signal RST may be used to selectively enable and disable source-follower transistor M3. Between times T0 and T6, supply circuitry 152 may provide supply voltage VAA as signal RSTD, which enables the operation of pixel reset (e.g., operations substantially similar to operations of FIG. 4). At time T6 after reset signal RST has been de-asserted, signal RSTD may be de-asserted. To disable pixel 120, supply circuitry 152 may supply a low voltage as RSTD, subsequently pulse RST to allow the low RSTD voltage to pass to floating diffusion region FD and disable transistor M3 (e.g., the low voltage is less than the threshold or on-voltage of transistor M3). If desired, pixel enabling and disabling operations using signal RSTD may be performed row-wide to operate pixel array 101 similarly to arrangements having a row select transistor M4. In other words, supply circuitry 152 may supply an RSTD signal for each row and the RSTD signal for a given row is provided to all pixels in that given row.

Figure 7:
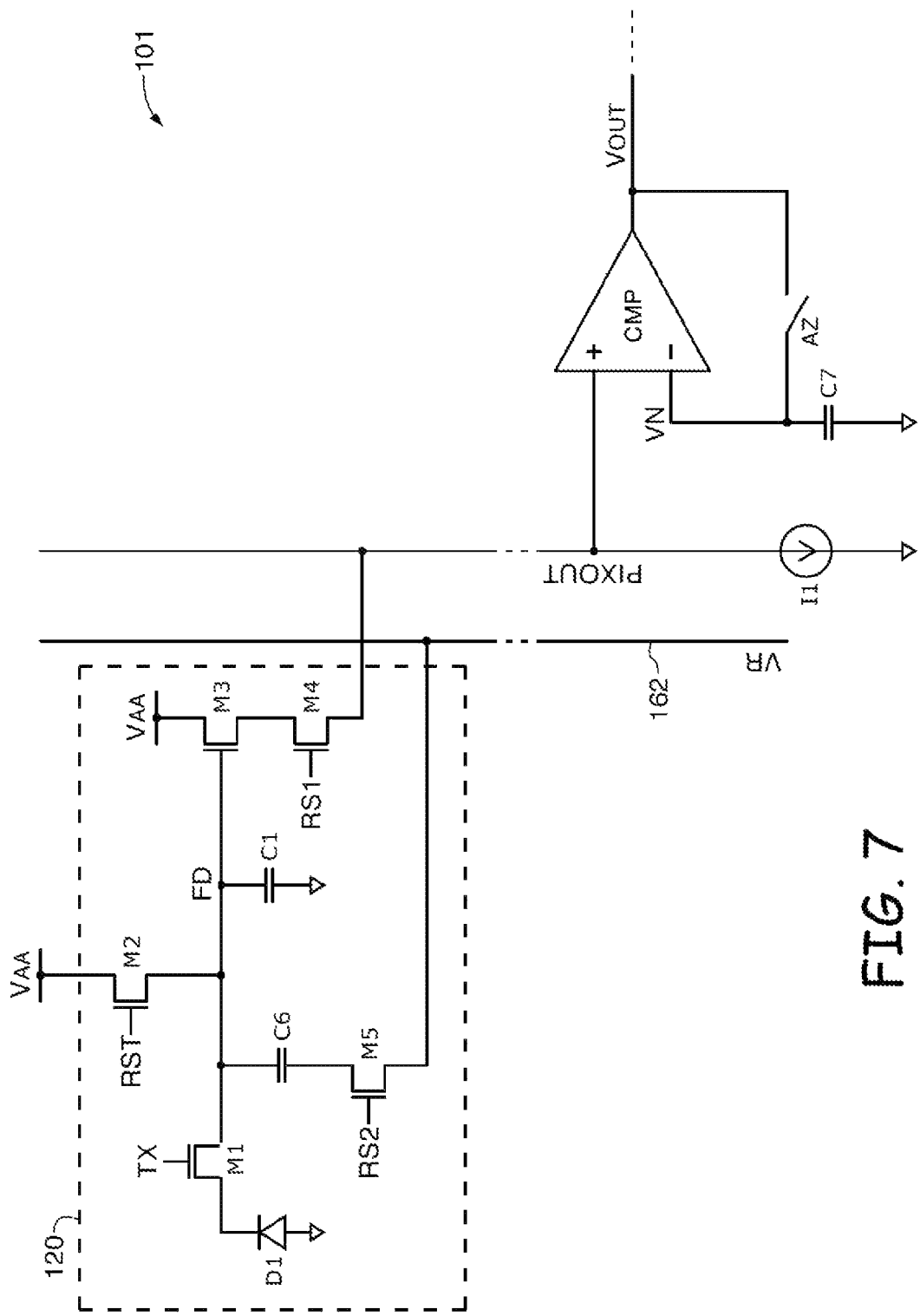
FIG. 7 is a circuit diagram of a portion of an imager including a pixel that is provided with a ramp signal via a path extending vertically across the imager in accordance with an embodiment of the present invention.

The example of FIGS. 3 and 5 in which ramp signal VR is provided to floating diffusion regions FD across a row of pixels is merely illustrative. As shown in FIG. 7, ramp signal VR may be provided along vertical path 162. Vertical path 162 may be coupled to floating diffusion regions FD of each pixel of a column of pixels. Each vertical path may be coupled to a respective diffusion region FD by capacitor C6 and row select transistor M5. Different pixel columns may be provided with respective ramp signals via different paths 162. Ramp signal VR may be generated for each row by ramp circuitry similar to ramp circuitry 136 of FIG. 3.

Figure 8:
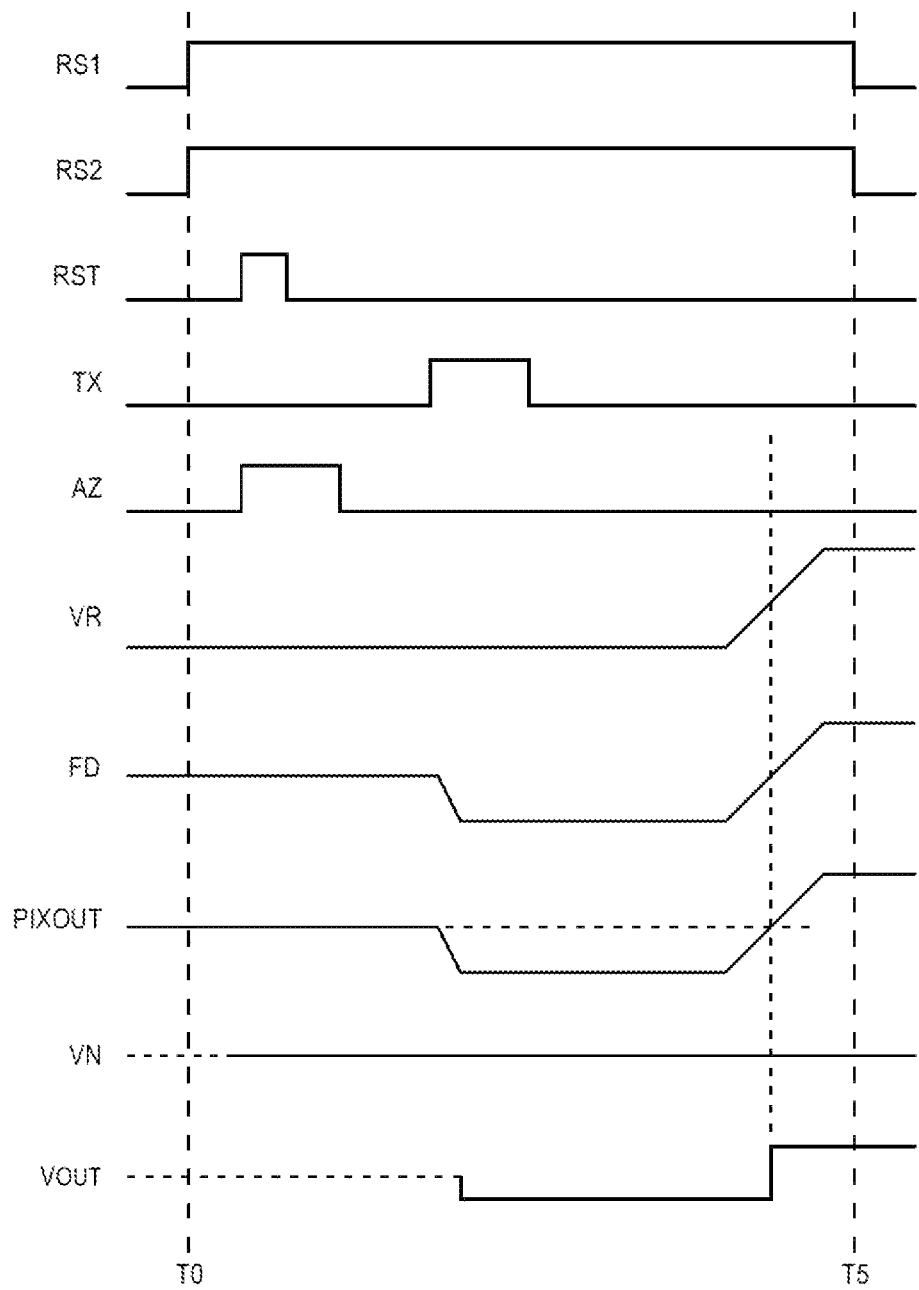
FIG. 8 is a timing diagram of pixel readout operations that may be performed using the pixel of FIG. 7 in accordance with an embodiment of the present invention.

In the example of FIG. 7, row select transistors M4 and M5 are provided with respective row select signals RS1 and RS2. As shown in the timing diagram of FIG. 8, row select transistors RS1 and RS2 may be asserted to enable row select transistors M4 and M5 during readout operations of pixel 120 between times T0 and T5 (e.g., readout operations similar to FIG. 4) and may be deasserted to disable row select transistors M4 and M5 when not performing readout of pixel 120.

Figure 9:
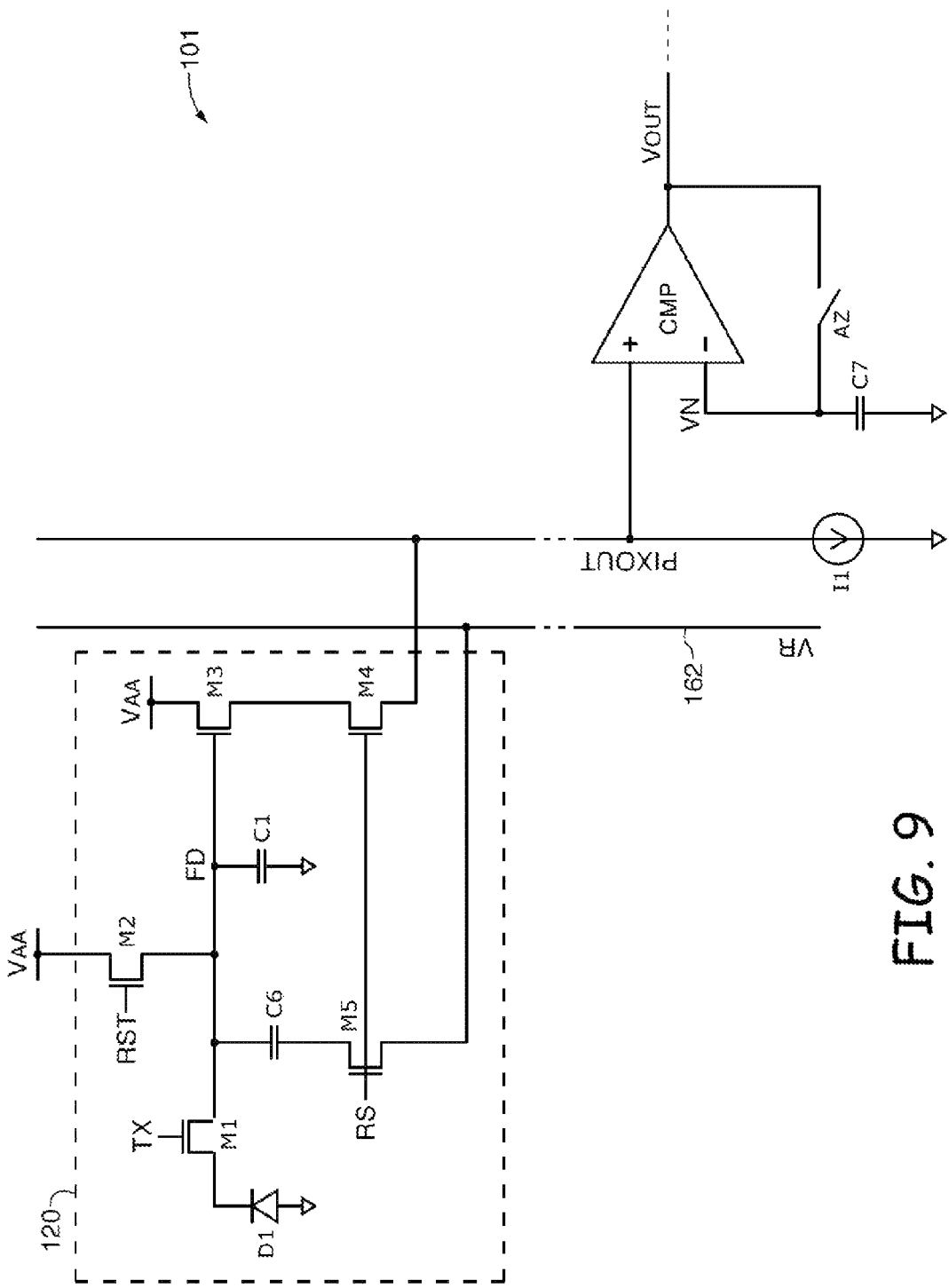
FIG. 9 is a circuit diagram of a portion of an imager including a pixel that is provided with a ramp signal via a path extending vertically across the imager and including row select transistors that share a row select signal in accordance with an embodiment of the present invention.
Figure 10:
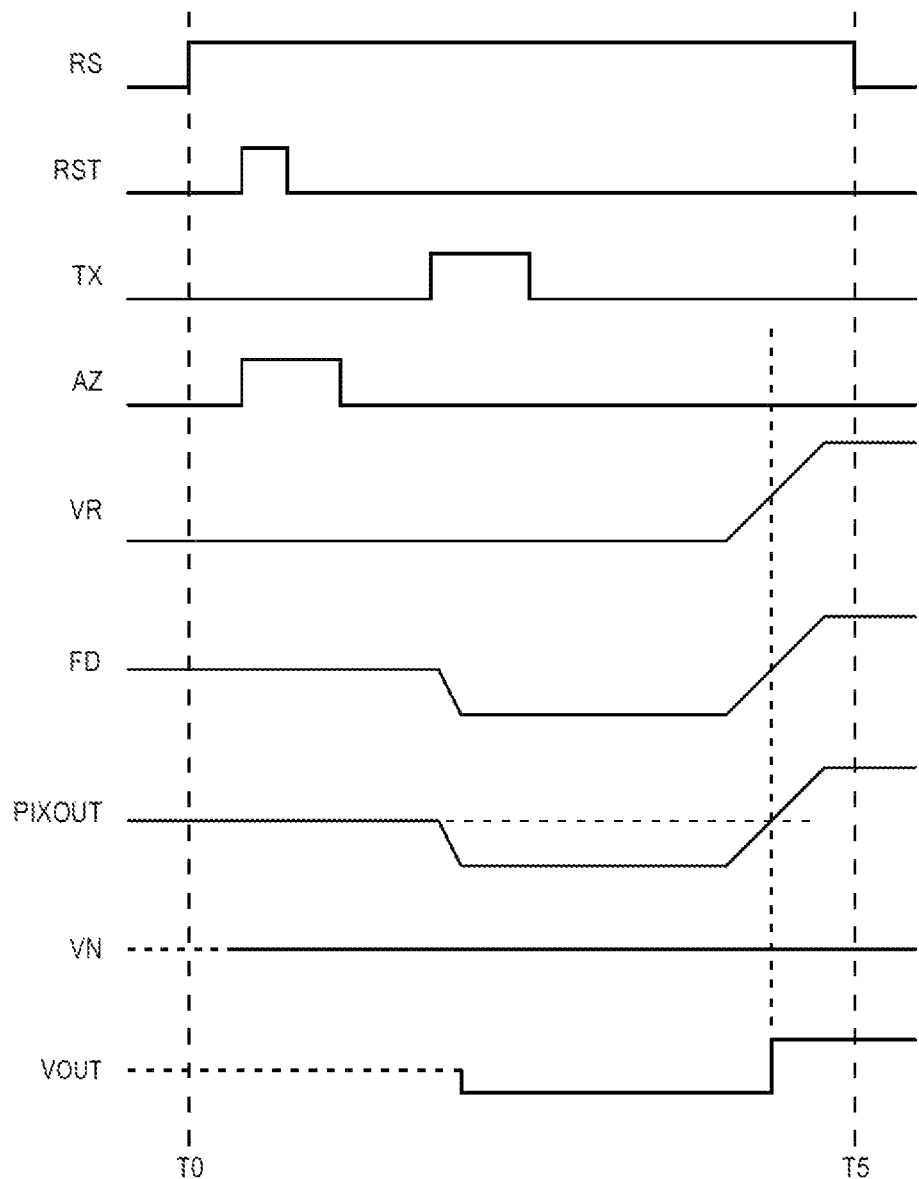
FIG. 10 is a timing diagram of pixel readout operations that may be performed using the pixel of FIG. 9 in accordance with an embodiment of the present invention.

The example of FIG. 7 in which row select transistors M4 and M5 are provided with respective row select signals is merely illustrative. If desired, the gates of transistors M4 and M5 may each be provided with shared row select signal RS as shown in FIG. 9. As shown in the timing diagram of FIG. 10, readout operations of pixel 120 with shared row select signal RS may be similar to readout operations of FIG. 4.

Figure 11:
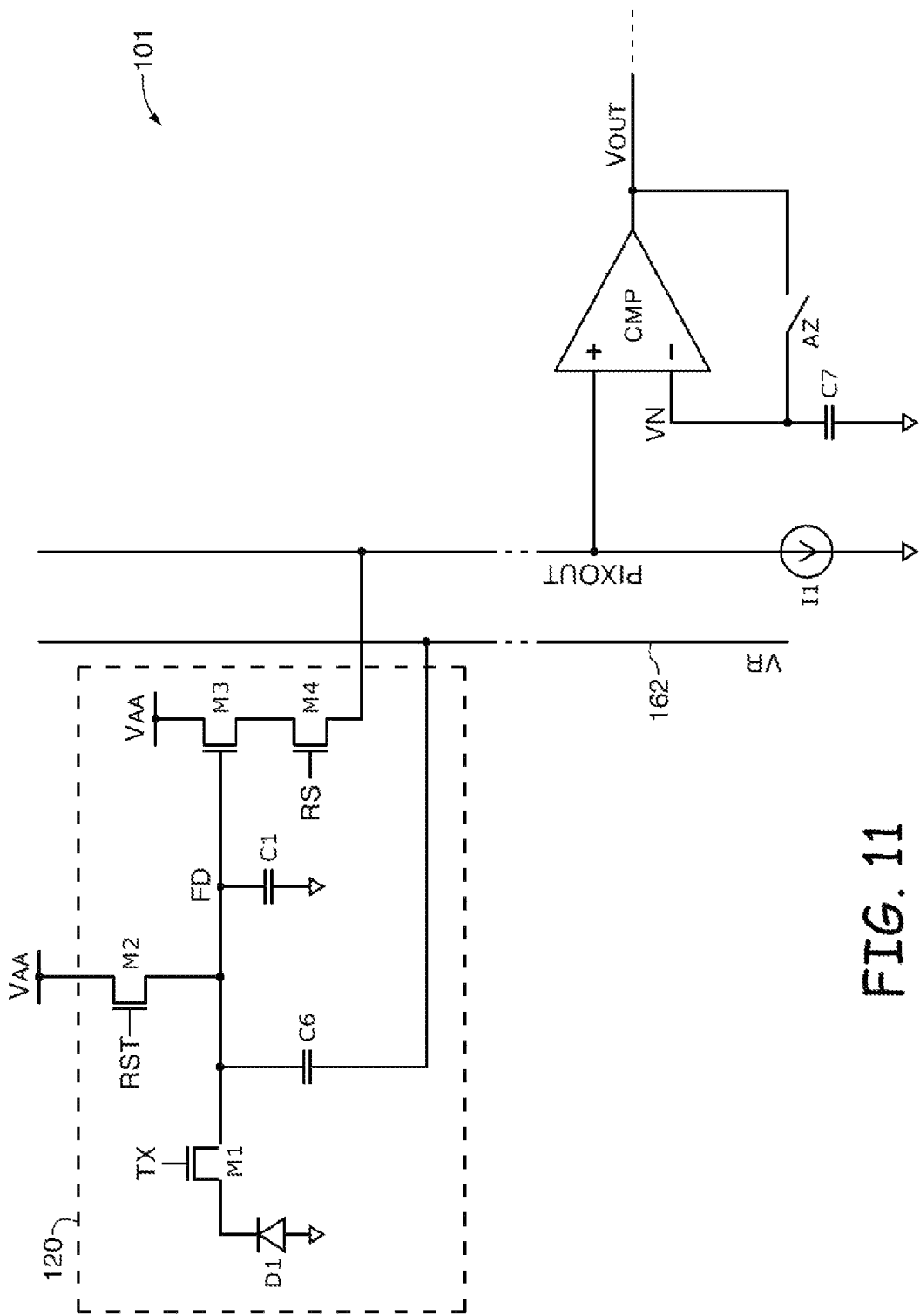
FIG. 11 is a circuit diagram of a portion of an imager including a pixel that is provided with a ramp signal via a path extending vertically across the imager and with only one row select transistor coupled to a source-follower transistor in accordance with an embodiment of the present invention.
Figure 12:
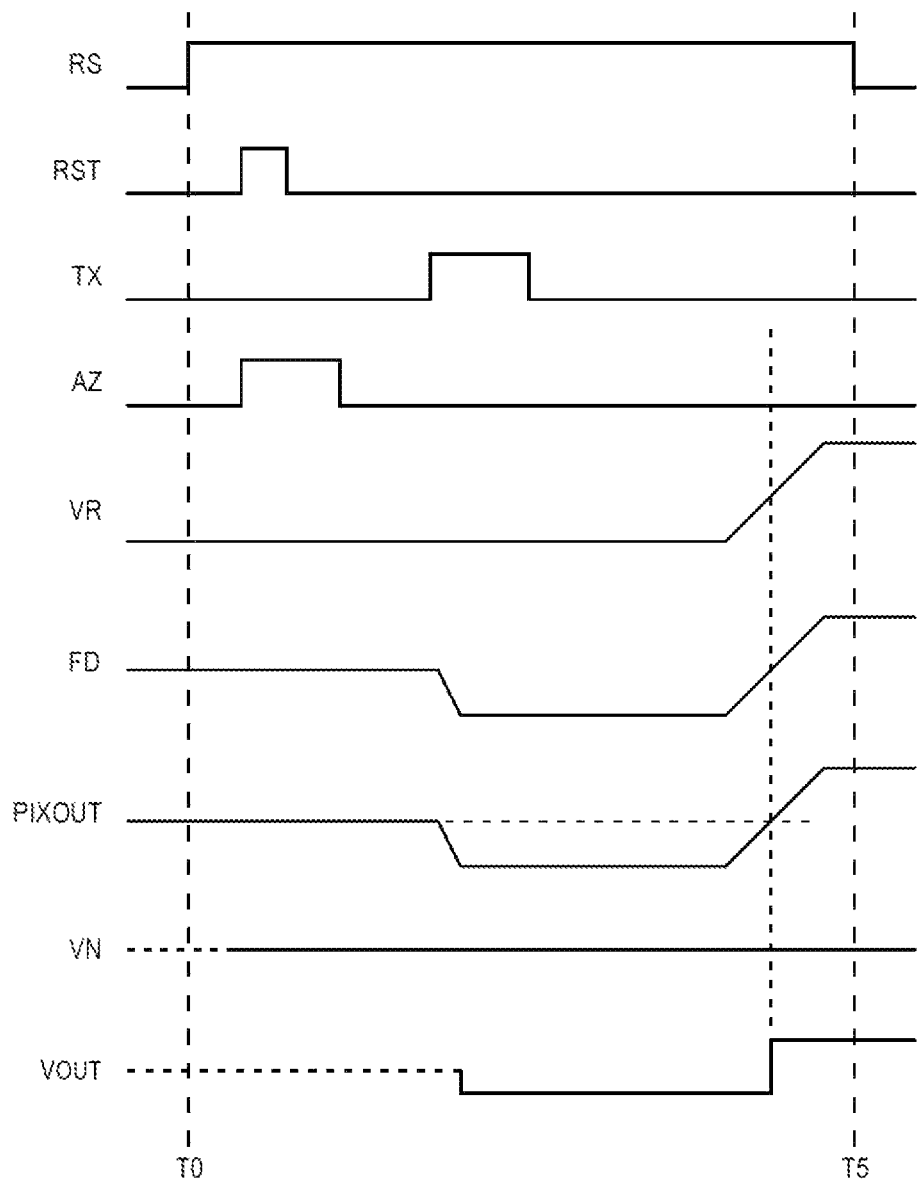
FIG. 12 is a timing diagram of pixel readout operations that may be performed using the pixel of FIG. 11 in accordance with an embodiment of the present invention.

If desired, a portion of row select transistors of each pixel 120 may be omitted. In the example of FIG. 11, row select transistor M5 of FIG. 9 that is coupled between capacitor C6 and ramp signal path 162 is omitted and only row select transistor M4 is used. In other words, capacitor C6 may directly receive ramp signal VR and pass ramp signal VR to floating diffusion region FD during readout operations. As shown by the timing diagram of FIG. 12, row select transistor M4 may be controlled using row select signal RS to enable pixel readout operations between times T0 and T5 similarly to pixel readout operations of FIG. 4.

Figure 6:
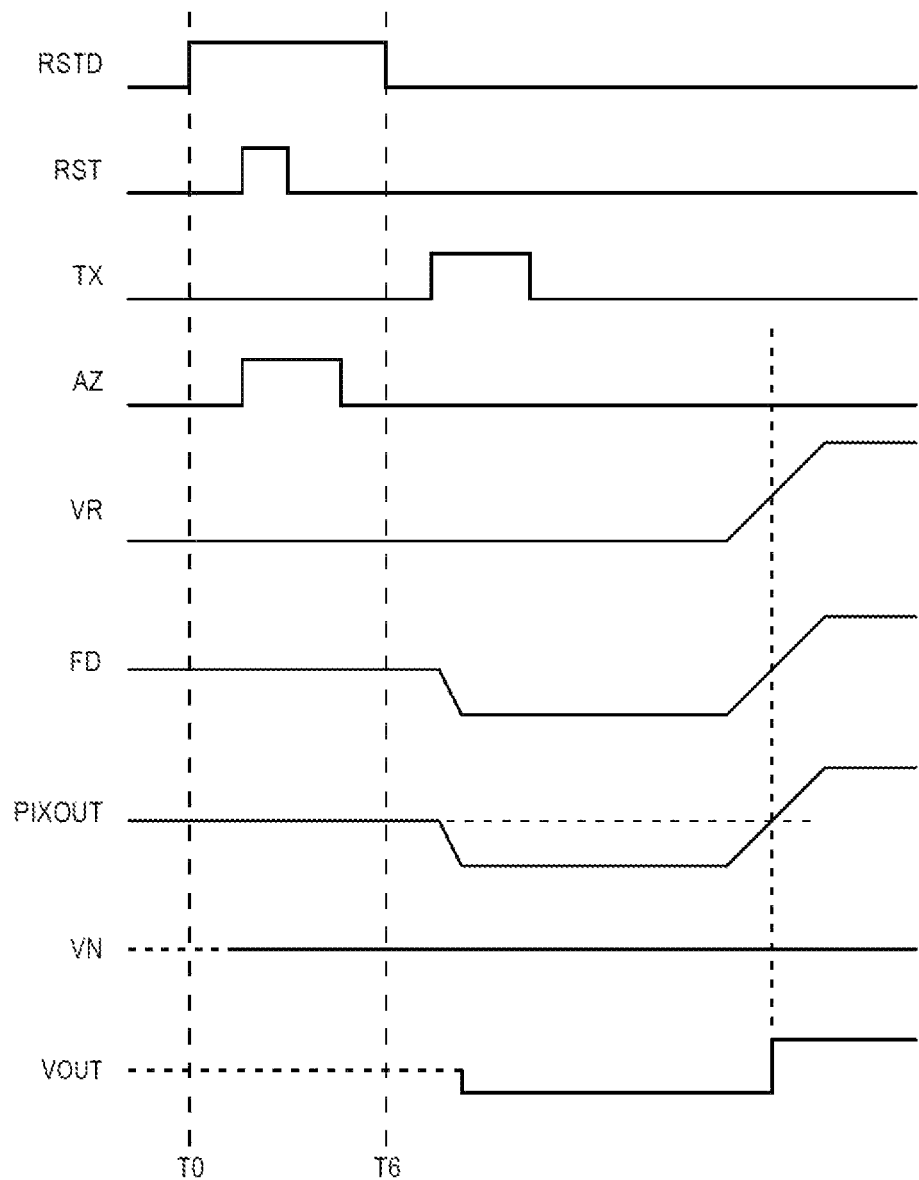
FIG. 6 is a timing diagram of pixel readout operations that may be performed using the pixel of FIG. 5 in accordance with an embodiment of the present invention.
Figure 13:
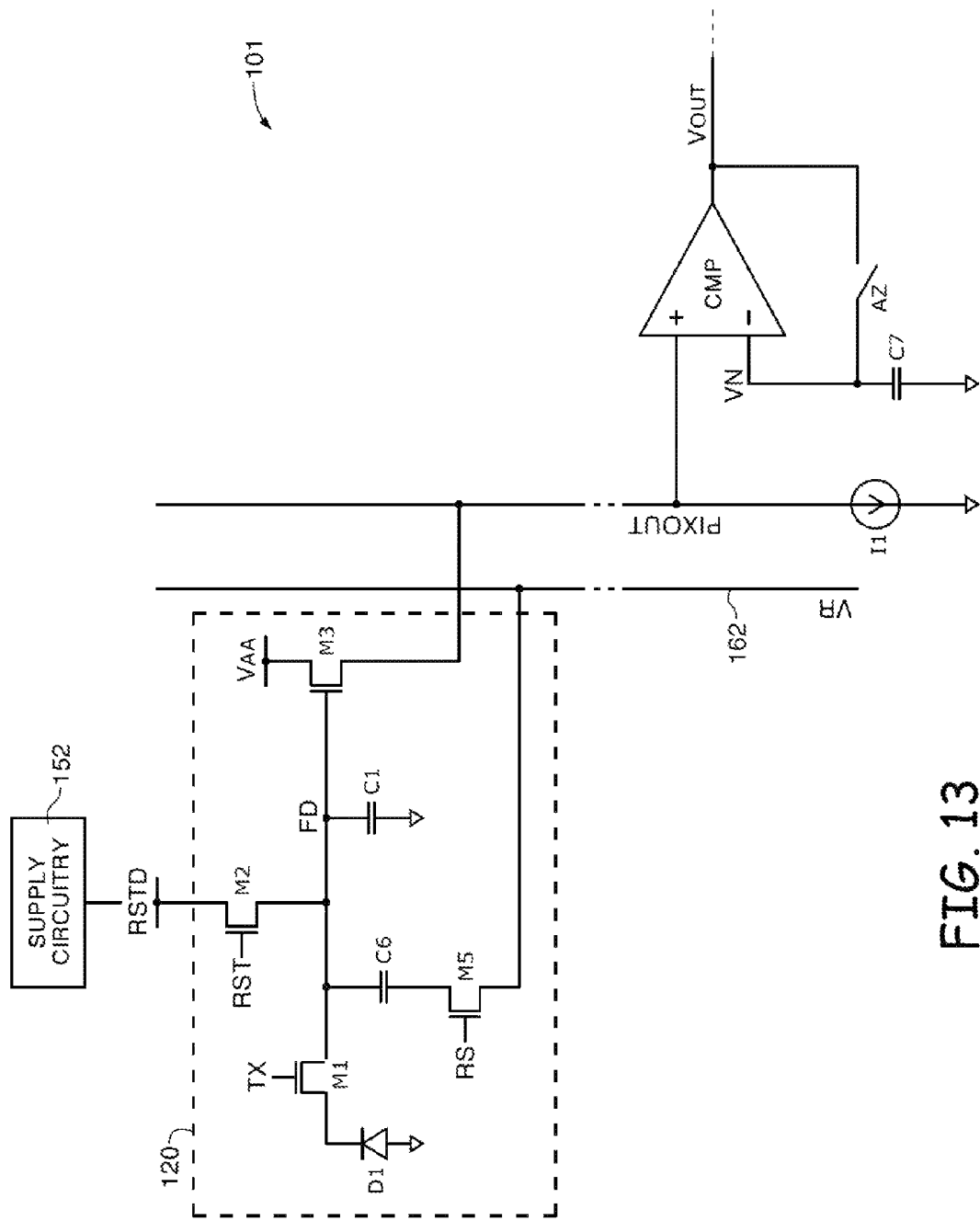
FIG. 13 is a circuit diagram of a portion of an imager including a pixel that is provided with a ramp signal via a path extending vertically across the imager and with only one row select transistor coupled to ramp circuitry in accordance with an embodiment of the present invention.
Figure 14:
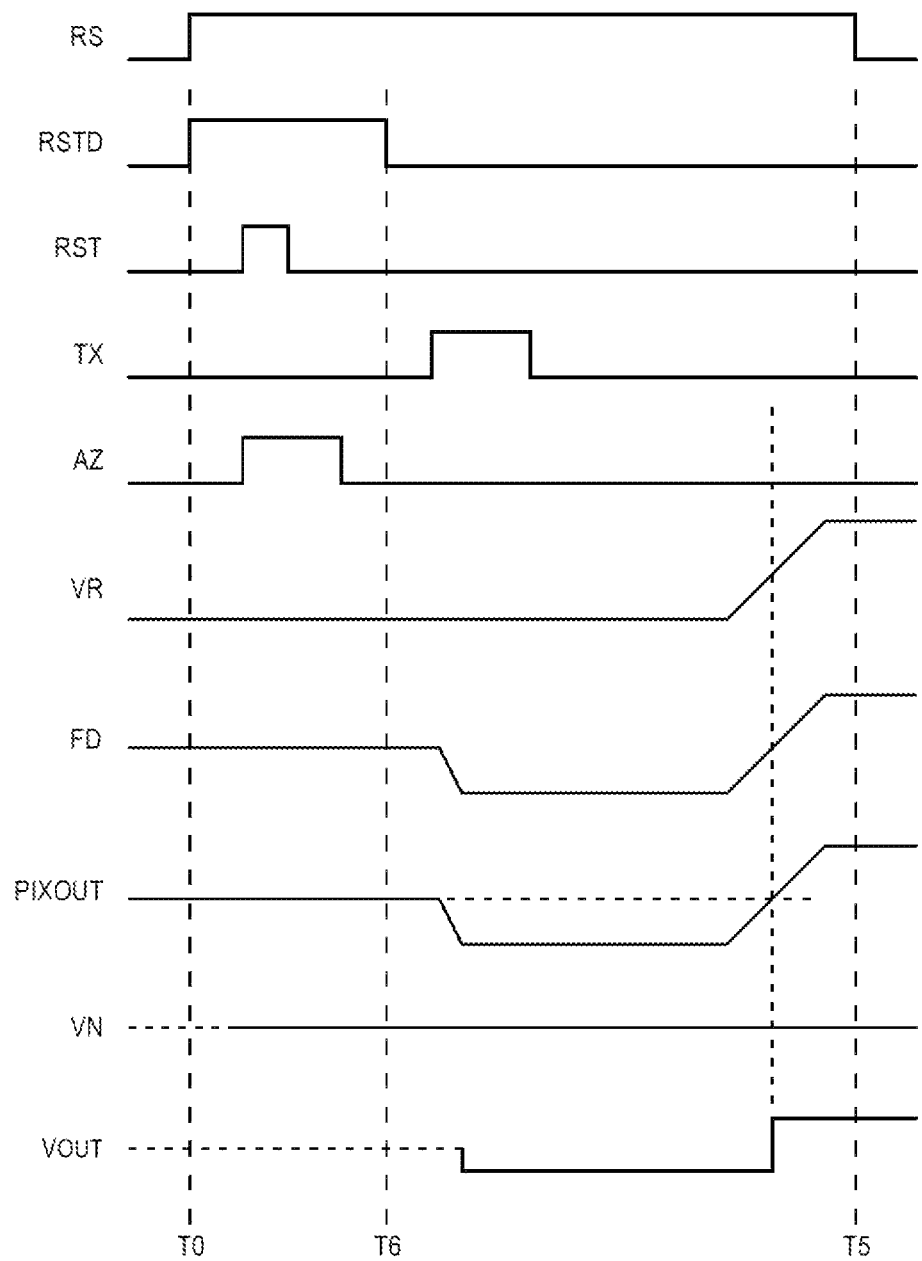
FIG. 14 is a timing diagram of pixel readout operations that may be performed using the pixel of FIG. 13 in accordance with an embodiment of the present invention.

In the example of FIG. 13, row select transistor M4 may be omitted similarly to FIG. 5 while maintaining only row select transistor M5. As shown in FIG. 13, supply circuitry 152 may supply signal RSTD to a source-drain terminal of reset transistor M2 that, in combination with reset signal RST, selectively enables or disables source-follower transistor M3. Row select transistor M5 may provide additional control over pixel readout operations (e.g., row select signal RS may control row select transistor M5 similarly as row select signal RS2 of FIG. 7 controls transistor M5). As shown in the timing diagram of FIG. 14, row select signal RS may be asserted between times T0 and T5 (e.g., similar to signal RS2 of FIG. 7) and signal RSTD may be supplied between times T0 and T6 (e.g., similar to FIG. 6) to control pixel readout operations of pixel 120 of FIG. 13.

Figure 15:
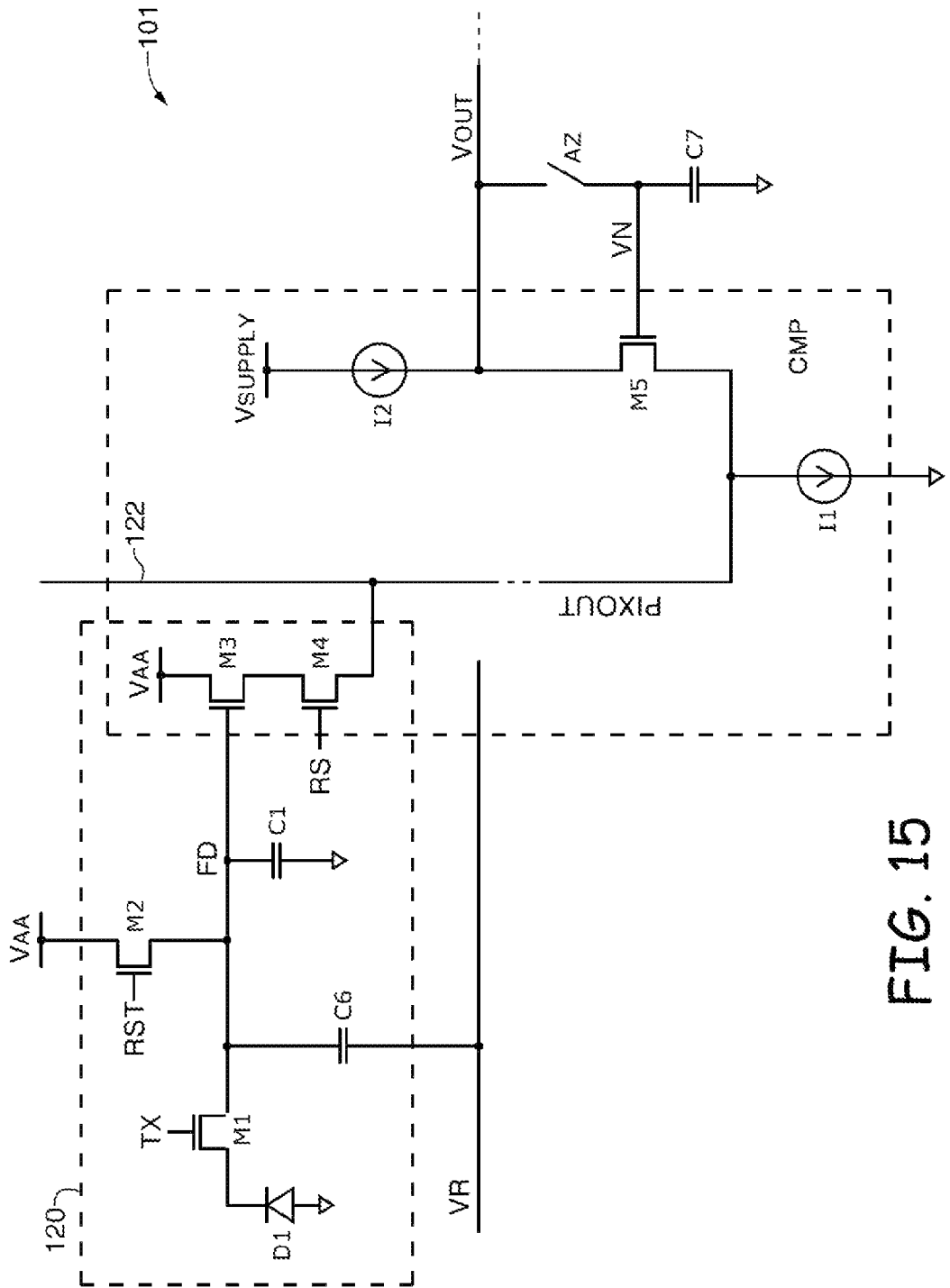
FIG. 15 is a circuit diagram of a portion of an imager including a pixel that is provided with a ramp signal and comparator circuitry that shares a portion of the pixel circuitry in accordance with an embodiment of the present invention.

Comparators such as comparator CMP of FIG. 3 may be implemented using a differential pair amplifier in which a differential pair of transistors receives a differential input signal (e.g., a differential input signal formed between PIXOUT and VN). The differential input signal is amplified to produce an amplifier output signal such as VOUT. FIG. 15 is a diagram of an illustrative portion of a pixel array 101 in which a portion of pixel 120 is used to implement a portion of a differential amplifier that serves as comparator CMP. In other words, pixel 120 and differential amplifier CMP may overlap and share resources, which may help to reduce circuit area and cost.

As shown in FIG. 15, transistors M3 and M6 serve as a differential pair of transistors. The transistor gate of transistor M3 receives the pixel signal at floating diffusion node FD, whereas the gate of transistor M6 receives signal VN. The difference in voltage between the pixel signal at the input gate transistor M3 and signal VN at the input gate of transistor M6 may be amplified to produce output signal VOUT. In this scenario, current I1 supplied by column driver circuitry may be used in biasing transistors M3 and M6 at a desired operating point (e.g., for desired amplifier gain).

Figure 16:
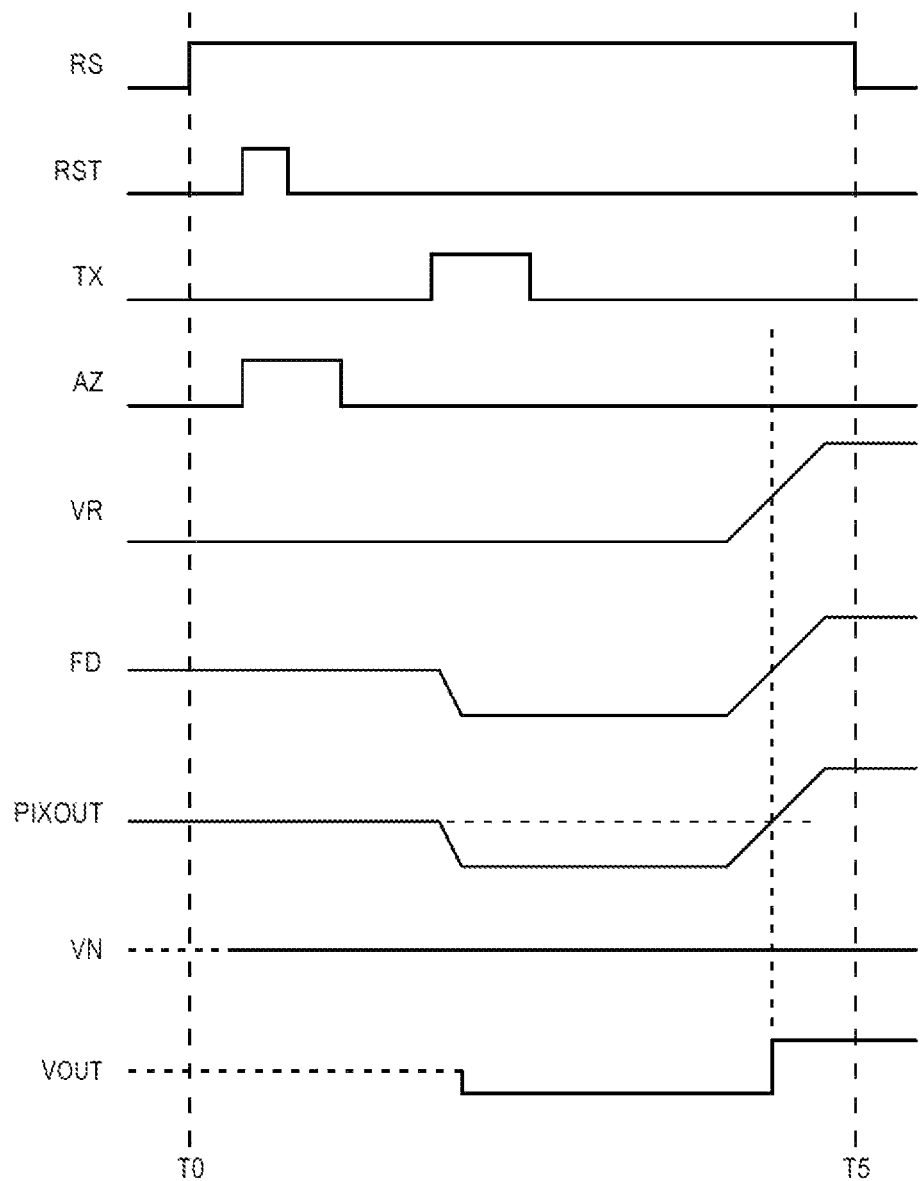
FIG. 16 is a timing diagram of pixel readout operations that may be performed using the pixel of FIG. 15 in accordance with an embodiment of the present invention.

Use of source-follower transistor M3 as a portion of comparator CMP helps to reduce circuit area (e.g., because it is not necessary to provide two or more additional transistors in implementing comparator CMP) without substantially altering readout operations of pixel 120. As shown in FIG. 16, pixel readout operations between times T0 and T5 for a pixel that shares circuitry with a comparator may be substantially similar to readout operations of FIG. 4 for a pixel with comparator circuitry that is separate from and does not include any portions of pixel 120.

Column-dependency of pixel noise can result in visual artifacts that may be detectable by human eyes. Use of shared circuitry between pixels and comparator circuitry helps to reduce column-dependency of pixel output signals. For example, noise associated with comparator CMP is column-dependent because each column is provided with a respective comparator CMP. The column-dependent noise contributed by comparator CMP is reduced because a portion of comparator CMP is implemented within individual pixels and is no longer column-dependent.

Figure 17:
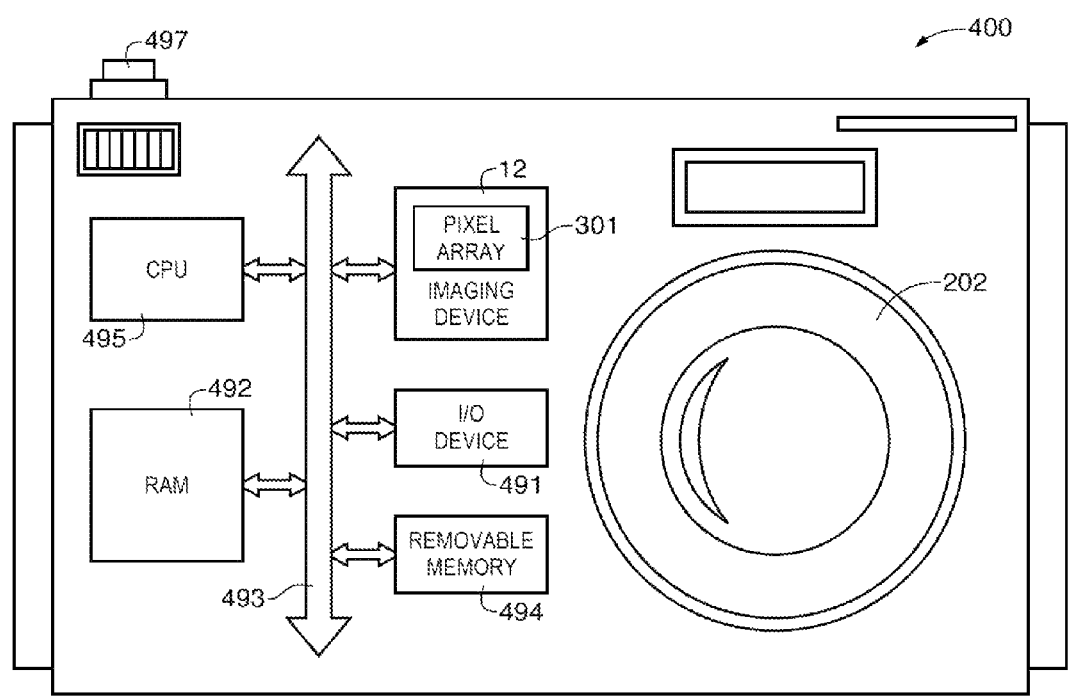
FIG. 17 is a block diagram of a processor system employing the imager of FIG. 2 in accordance with an embodiment of the present invention.

FIG. 17 is a simplified diagram of an illustrative processor system 400, such as a digital camera, which includes an imaging device 12 (e.g., the camera module of FIG. 1) employing an imager having pixels with improved pixel readout and analog-to-digital conversion capabilities as described above. The processor system 400 is exemplary of a system having digital circuits that could include imaging device 12. Without being limiting, such a system could include a computer system, still or video camera system, scanner, machine vision system, vehicle navigation system, video phone, surveillance system, auto focus system, star tracker system, motion detection system, image stabilization system, and other systems employing an imaging device.

Processor system 400, for example a digital still or video camera system, generally includes a lens 202 for focusing an image on pixel array 101 when a shutter release button 497 is pressed, central processing unit (CPU) 495, such as a microprocessor which controls camera and one or more image flow functions, which communicates with one or more input/output (I/O) devices 491 over a bus 493. Imaging device 12 also communicates with CPU 495 over bus 493. System 400 also includes random access memory (RAM) 492 and can optionally include removable memory 494, such as flash memory, which also communicates with CPU 495 over the bus 493. Imaging device 12 may be combined with the CPU, with or without memory storage on a single integrated circuit or on a different chip. Although bus 493 is illustrated as a single bus, it may be one or more busses, bridges or other communication paths used to interconnect system components of system 400.

Various embodiments have been described illustrating imagers with pixels having improved pixel readout and analog-to-digital conversion capabilities.

An imager may include an array of pixels. The pixel array may be arranged in rows and columns. Each pixel of the pixel array may include a photodiode that is coupled to a floating diffusion region by a transfer gate. A source-follower transistor may be coupled between the floating diffusion region and a pixel output node (e.g., a column interconnect that is coupled to each pixel of a column and serves as a pixel output node for each pixel of the column). The imager may include ramp circuitry that provides a ramp signal to the floating diffusion region. A capacitor interposed between the ramp circuitry and the floating diffusion region may be used in conveying the ramp signal to the floating diffusion region.

The pixel array may include a comparator having first and second inputs and a comparator output. The first input may be coupled to the pixel output node and receive a pixel output signal. The comparator output may be coupled to the second input via a negative feedback path. The negative feedback path may include a switch that is interposed between the second input and the comparator output. A capacitor may be coupled between the second input and the ground terminal and may be used in temporarily storing a reset value of the pixel. The comparator and the ramp signal provided to the floating diffusion region may be used in performing analog-to-digital conversion of charge accumulated by the photodiode. Analog-to-digital circuitry such as a counter may be coupled to the comparator output.

A comparator may be provided for each pixel of the pixel array. The comparator for each pixel may be implemented using separate circuitry or may include portions of that pixel. The comparator may include a differential pair of transistors. The source-follower transistor of the corresponding pixel may serve as a transistor of the differential pair.

Each pixel may include a reset transistor that is coupled between the floating diffusion region of that pixel and supply circuitry. The reset transistor may receive a reset signal at a transistor gate and may receive a supply voltage from the supply circuitry. If desired, the supply circuitry may be used in selectively enabling and disabling the source-follower transistor by controlling the supply voltage (e.g., the supply voltage may serve as a control signal).

The foregoing is merely illustrative of the principles of this invention and various modifications can be made by those skilled in the art without departing from the scope and spirit of the invention.

What is claimed is:

1. A pixel array, comprising:
   an imaging pixel having a floating diffusion region; and
   ramp circuitry that provides a ramp signal to the floating diffusion region of the imaging pixel, wherein the imaging pixel comprises
   a photodiode;
   a transfer gate that is coupled between the photodiode and the floating diffusion region;
   a source-follower transistor having a gate terminal coupled to the floating diffusion region;
   supply circuitry;
   a row select transistor coupled between the ramp circuitry and the floating diffusion region; and
   a reset transistor coupled between the floating diffusion region and the supply circuitry wherein the reset transistor has a gate terminal that receives a reset signal, wherein the supply circuitry provides a control signal to a source-drain terminal of the reset transistor, and wherein the reset transistor uses the reset signal and the control signal to selectively enable and disable the source-follower transistor.

2. The pixel array defined in claim 1 further comprising a capacitor that is coupled between the floating diffusion region and a signal path that is coupled to the ramp circuitry, wherein the ramp signal is conveyed over the capacitor and the signal path to the floating diffusion region of the imaging pixel.

3. The pixel array defined in claim 2 wherein the image pixel comprises a given image pixel of a plurality of image pixels arranged in rows and columns.

4. The pixel array defined in claim 3 wherein the signal path extends across a given row of the plurality of image pixels.

5. The pixel array defined in claim 3 wherein the signal path extends across a given column of the plurality of image pixels.

6. The pixel array defined in claim 2 wherein the imaging pixel further comprises:
a differential pair of transistors that forms a comparator, wherein a given transistor of the differential pair is coupled to the floating diffusion region and serves as a source-follower amplifier for the image pixel.

7. The pixel array defined in claim 1 further comprising a comparator that receives a pixel output signal of the imaging pixel.

8. The pixel array defined in claim 7 wherein the comparator comprises:
a comparator output that provides a comparator output signal;
a first input that receives the pixel output signal; and
a second input that is coupled to the comparator output by a feedback path.

9. The pixel array defined in claim 8 wherein the feedback path comprises a switch that is interposed between the second input and the comparator output.

10. The pixel array defined in claim 9 further comprising a capacitor coupled between the second input and a ground terminal.

11. The pixel array defined in claim 10 further comprising:
analog-to-digital circuitry that is coupled to the comparator output.

12. An image pixel, comprising:
a photodiode;
a transfer gate that is coupled between the photodiode and a floating diffusion region;
a source-follower transistor coupled to the floating diffusion region;
a capacitor coupled between the floating diffusion region and a ramp signal path; and
a row select transistor having a first source-drain terminal coupled to the ramp signal path and a second source-drain terminal coupled to the capacitor, wherein the row select transistor is coupled between the ramp signal path and the floating diffusion region.

13. The image pixel defined in claim 12 further comprising:
an additional row select transistor that is coupled between a source-drain terminal of the source-follower transistor and an image pixel output.

14. The image pixel defined in claim 13, wherein a gate terminal of the row select transistor and a gate terminal of the additional row select transistor are both coupled to a single control line.

15. A system, comprising:
a central processing unit;
memory;
input-output circuitry; and
an imaging device, wherein the imaging device comprises:
a pixel array;
ramp circuitry that produces at least one ramp signal; and
a lens that focuses an image on the pixel array, wherein each pixel of the pixel array comprises:
a photodiode;
a storage node that stores charge collected by the photodiode and receives the ramp signal;
a source-follower transistor coupled between the storage node and a pixel output;
a capacitor coupled between the storage node and the ramp circuitry; and
a row select transistor having a first source-drain terminal coupled to the ramp circuitry and a second source-drain terminal coupled to the capacitor, wherein the row select transistor is coupled between the ramp circuitry and the storage node.

16. The system defined in claim 15 wherein the pixel array is arranged in rows and columns and wherein the ramp circuitry provides a respective ramp signal for each row of the pixel array.

* * * * *